United States Patent
Barnes (10) Patent No.: US 7,135,108 B1
(45) Date of Patent: Nov. 14, 2006

(54) WATER PURIFYER WITH EXTRUDED BODY HAVING CIRCUMFERENTIALLY ARRANGED TUBES

(76) Inventor: Ronald L. Barnes, 2823 Castle Pine Cir., Owens Cross Road, AL (US) 35763

( * ) Notice: Subject to any disclaimer, the term of this patent is extended or adjusted under 35 U.S.C. 154(b) by 279 days.

(21) Appl. No.: 10/668,504

(22) Filed: Sep. 23, 2003

Related U.S. Application Data (63) Continuation-in-part of application No. 09/752,982, filed on Dec. 31, 2000, now Pat. No. 6,623,635, which is a continuation-in-part of application No. 09/418,915, filed on Oct. 15, 1999, now Pat. No. 6,342,154.

(51) Int. Cl.
*C02F 1/78* (2006.01)
(52) U.S. Cl. .......... 210/120; 210/192; 422/186.12; 250/437
(58) Field of Classification Search ........ 210/120, 210/192, 760; 422/186.12, 186.07, 24; 250/437
See application file for complete search history.

(56) References Cited

U.S. PATENT DOCUMENTS 5,766,490 A * 6/1998 Taylor et al. .......... 210/758

FOREIGN PATENT DOCUMENTS

EP 269941 A1 * 6/1988

* cited by examiner

*Primary Examiner*—Terry K. Cecil
(74) *Attorney, Agent, or Firm*—Mark Clodfelter (57) ABSTRACT

A water purifying apparatus is constructed having a plurality of vertical, water-carrying tubes circumferentially arranged so as to form a hollow central region enclosed by the tubes. A top cap and bottom cap are configured so as to channel water through the tubes in serial relation and alternately in upward and downward directions. The hollow central region forms a last water-carrying chamber, and houses a bubble separator and ozone generator. A venturi mixes ozone at an inlet to the first water-carrying tube. The ozone generator is constructed having an ultraviolet-transmissive tube sealed from the water in the hollow central region, and contains an ultraviolet lamp that in addition to generating ozone, provides ultraviolet light to kill pathogens that survive the ozone treatment and also disassociates ozone. A closed loop system may be implemented by providing gas from the bubble separator back to the venturi.

15 Claims, 6 Drawing Sheets

WATER PURIFYER WITH EXTRUDED BODY HAVING CIRCUMFERENTIALLY ARRANGED TUBES

CROSS REFERENCE TO RELATED APPLICATION

This application is a continuation-in-part of patent application Ser. No. 09/752,982, filed Dec. 31, 2000, now U.S. Pat. No. 6,623,635, which is a continuation-in-part of patent application Ser. No. 09/418,915, filed Oct. 15, 1999, now U.S. Pat. No. 6,342,154.

FIELD OF THE INVENTION

This invention relates to ozone-based water purification systems. More particularly, this invention relates to circumferentially arranged tubes in a vertical orientation, with a central region enclosed by the tubes forming a compartment through which water flows last and which may contain a bubble separator and an ultraviolet ozone generator in a ultraviolet-transparent housing to promote advanced oxidation reactions in the water and air in the bubble separator.

BACKGROUND OF THE INVENTION

Commonly known ozone water purification systems comprise the elements of an ozone gas generating apparatus, a water carrying tube including an ozone contact time segment, and a bubble separating column or chamber. The ozone generating apparatus typically comprises a cylindrical chamber through which atmospheric air containing diatomic oxygen is pumped or drawn. Radiation from a lamp capable of emitting intense ultraviolet light having a wavelength of approximately 185 nanometers excites the diatomic oxygen within the chamber. As a result of such molecular excitation, a fraction of the diatomic oxygen within the chamber is split, producing free atoms of oxygen. As a result of their extremely high chemical reactivity, free oxygen atoms within the chamber rapidly react with the remaining intact oxygen, forming molecules having three atoms of oxygen. Molecules consisting of three oxygen atoms are commonly referred to as ozone, which exists naturally as a gas.

Another commonly known method of producing ozone gas within a chamber is to introduce closely spaced electrodes therein and to induce a sufficient electrical potential difference between the electrodes to produce electric discharge arcing. Diatomic oxygen molecules in close proximity with such electrical arcing similarly degrade into free oxygen atoms, which quickly react with diatomic oxygen to form ozone gas.

In commonly known configurations of ozone water purification systems, ozone-rich air emitted from the ozone generator apparatus is introduced into a stream of water in need of purification, such water typically moving through a tube. Where the air within the ozone-generating apparatus is pressurized by, for example, an air compressor, the output of the ozone generator may be introduced into the water-carrying tube by means of a simple air line interlinking the output of the ozone generator and an aperture extending through the wall of the water-carrying tube. Alternately, the air line may terminate at a venturi installed in line with the tube creating a localized venturi effect at the output end of the air line. Use of a venturi allows the kinetic energy of water within the water-carrying tube to perform work upon the air within the air line, drawing air through the ozone generator via the air line and into the stream of water.

Ozone carrying air which is either injected into the contaminated water stream or drawn into the stream by a venturi initially exists in the form of air bubbles. In order for the ozone gas to have a purifying effect upon the water, such gas must be dissolved into the water. Such dissolving of the gas into the water necessarily occur at the spherical surface tension boundaries between the gas and the water. A high solubility differential between common air components and ozone gas causes the ozone within such air bubbles to dissolve more quickly than other gases. An exception to this occurs where an ozone residual exists in water in close proximity to the bubbles. Here, rate of infusion of ozone into the water may be reduced due to the strong negative charge of the ozone molecules. In any case, ozone carrying bubbles must remain immersed in water a sufficient length of time to achieve sufficient dissolution of ozone.

In commonly configured ozone water purification systems, the water-carrying tube serves dual functions, both transporting water containing dissolved ozone to its desired destination, and providing an elongated immersion chamber where air bubbles containing ozone may remain in contact with the water for a sufficient length of time to allow dispersion of the ozone into the water. In order for ozone dispersion to occur within the water-carrying tube, the tube must have a sufficient length, i.e., an ozone contact time length. The contact length of the tube may typically be between approximately 1–4 feet or so in length. However, the length may vary depending upon variables such as rate of flow within the tube, turbulence, organic loading and water temperature. Sharp turns within the tube or turbulence-inducing baffles or screens installed within the bore of the water carrying tube may serve the function of breaking larger ozone-carrying bubbles into smaller bubbles, increasing the overall surface area of the bubbles, and increasing the rate the ozone dissolves into the water. In addition, where an ozone residual exists water proximate the bubbles, transfer of ozone from the bubbles is inhibited. While venturi injectors or mixers such as those used in dissolving ozone into water provide a small bubble size, the flow of water just downstream the injector, within 12–15 inches or so, becomes laminar. As such, the bubbles, being entrained in a laminar flow just downstream the injector, become so closely packed together that they merge into larger bubbles. Further, the fluid moving with the bubbles in the laminar flow becomes permeated with ozone, inhibiting further transfer of ozone from the bubbles.

Where water bearing dissolved ozone gas is poured into a body of water such as, for example, a swimming pool, the ozone beneficially reacts with various contaminants. For example, ozone rapidly reacts with metal ions within the water, forming precipitants which may be removed through filtration. Ozone dissolved in water also degenerates or causes lysis of the cell walls of bacteria, killing bacteria, viruses and protozoan organisms. However, while ozone kills bacteria and viruses almost instantly, protozoa such as those that harbor the bacteria that cause Legionnaires disease require longer exposure to higher concentrations of ozone to be killed. Ozone within water also beneficially oxidizes and neutralizes sulfides, nitrates, cyanides, detergents, and pesticides. In all such cases, the efficacy of ozone in reacting with such contaminants is enhanced by reducing the physical distance between contaminant organisms or molecules and the molecules of ozone within the water. In a large volume of water, such as a drinking water storage tank, spa, or swimming pool, the concentration of dissolved ozone becomes undesirably low, slowing the rate at which the ozone reacts with contaminants. To prevent such dilution of ozone concentration, it is desirable to first introduce the ozone-carrying water into a reaction chamber having a smaller interior volume which maintains higher concentrations of ozone.

Accordingly, it is an object of the present invention to provide an ozone-based water purification system which incorporates in series an ozone generating apparatus and an ozone contact tubing segment, the contact segment configured as vertical tubes so that water flows alternately upwardly and downwardly in the tubes.

It is another object of the invention to provide such an ozone-based water purification system wherein turbulence and mixing of the flow of water and bubbles is induced in the contact tubing segment. This keeps bubble size small, and does not allow a buildup of ozone in water proximate the bubbles, allowing more ozone to dissipate into the water. In addition, this mixing and turbulence enhances killing of bacteria and viral organisms by disturbing the laminar flow within the contact tubing segment.

It is a further object of the invention to provide a water purification unit having all components integrated therein, and which is of sufficiently small size so as to be easily mountable in a housing or frame for a hot tub, spa or jetted tub. In another embodiment for a larger facility, such as a pool, the components are integrated into a larger version, both versions having a body integrating the various flow tubes and compartments and formed by an extrusion.

Other objects and benefits of the present invention will become known to those skilled in the art upon review of the detailed Description which follows, and upon review of the appended drawings.

DETAILED DESCRIPTION OF THE PREFERRED EMBODIMENT

Figure 1:
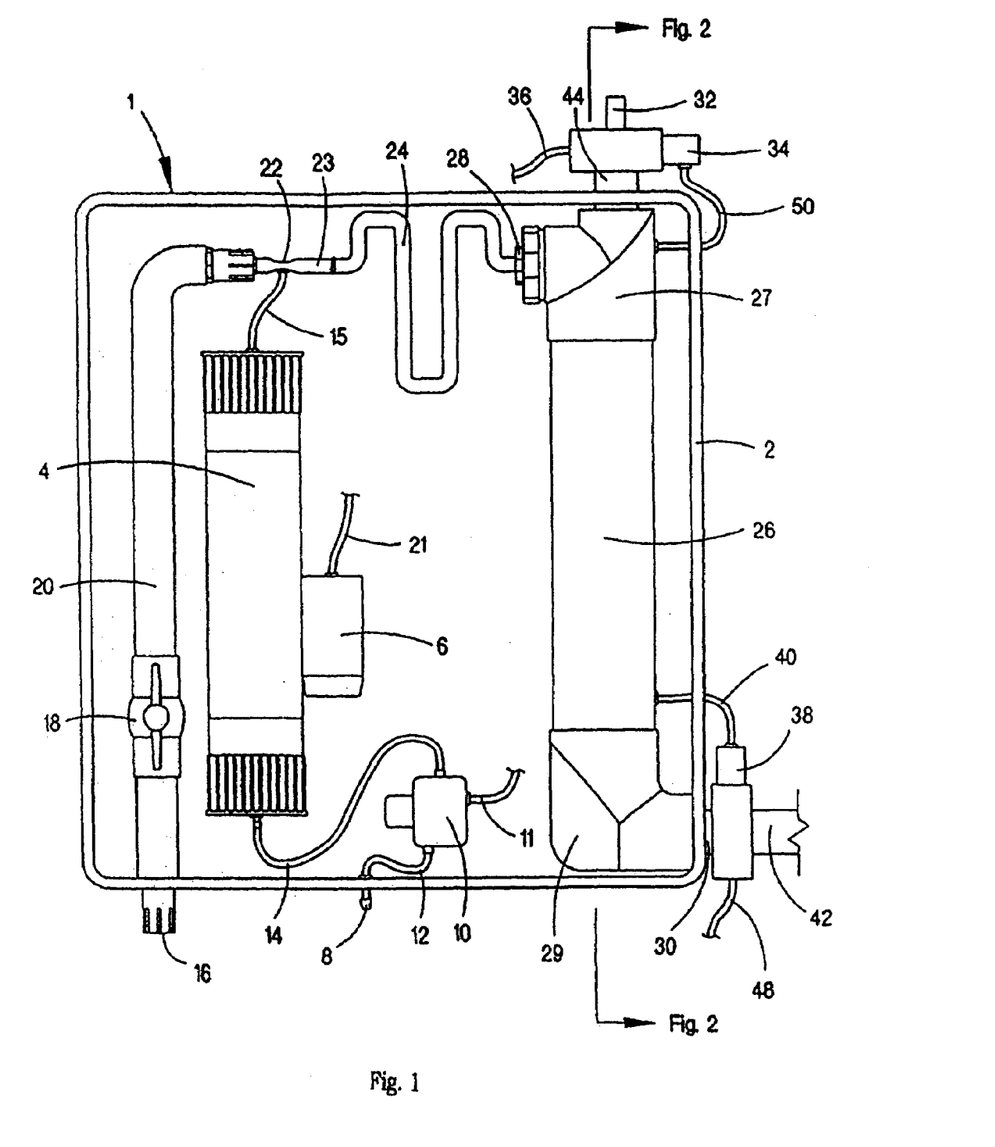
FIG. 1 is a representational diagram of the instant inventive assembly, components thereof being shown encased within a housing.

Referring now to the drawings, and in particular to FIG. 1, the instant inventive assembly for purifying water is referred to generally by reference arrow 1. The major components of the assembly 1 may be, but not necessarily, housed within a rigid casing 2. Such casing 2 conveniently compartmentalizes the assembly 1 for use in conjunction with pool plumbing systems, spa plumbing systems, drinking water systems and other similar systems.

Referring further to FIG. 1, the assembly 1 for purifying water has two fluid input ports, they being an atmospheric air input port 8 and a contaminated water input port 16. Atmospheric air may be drawn into and through the air input port 8 by an electric motor-driven air compressor 10, electrical power being supplied to the air compressor 10 via an electrical power cord 11 (Electrical circuitry and wiring of the assembly is common and is not completely shown). Compressed air from the air compressor 10 is driven through air line 14 into and through a high intensity ultraviolet light ozone gas generator 4, such ozone generator 4 having an electric ballast 6 conventionally powered via electric power cord 21. The high intensity ultra-violet light ozone generator 4 has a hollow bore through which the atmospheric air passes, the hollow bore typically having an axially mounted ultraviolet light emitting element. Exposure of diatomic oxygen within the bore of the ozone generator 4 to the ultraviolet light breaks down such molecules, producing free atomic oxygen which rapidly reacts with unbroken 02 molecules to form ozone gas.

In another embodiment, a corona discharge ozone gas generator may be used in place of a high intensity ultraviolet light ozone generator. Electrical arcing within a corona discharge ozone generator similarly acts upon diatomic oxygen to form ozone gas.

Referring further to FIG. 1, air containing an enhanced concentration of ozone gas exits the output end of the ozone generator 4 to pass through an output air line 15. Simultaneously with the flow of such atmospheric air, water in need of purification is pumped into water input port 16 and thence through a water-carrying tube 20; the flow through such tube 20 being selectively terminable by a manual shut off valve 18.

In operation of the assembly 1, contaminated water carried through the water-carrying tube 20 combines with ozonated air having enhanced quantities of ozone gas at an ozone injection point 22. The ozone injection point 22 may be configured as a venturi 23, which draws ozone gas-bearing air through the ozone generator 4 and through the output air line 15. Where water is pumped through the water-carrying tube 20 at a high velocity, the venturi 23 typically has sufficient pumping power alleviate the need for an air compressor 10. Both the air compressor 10 and configuration of the ozone gas injection point 22 as a venturi 23 may be utilized in order to assure a sufficient flow of ozone-bearing air under all conditions.

Referring further to FIG. 1, air flowing downstream from the ozone injection point 22 initially exists in the form of bubbles immersed within the contaminated water. Necessarily, the ozone gas within such bubbles is dissolved within the water in order to beneficially react with and purify water-carried pathogens and contaminants. A lengthened ozone contact time segment of tubing 24 extends downstream from the ozone gas injection point 22; such segment 24 assuring that gas bubbles containing ozone gas remain submerged within the contaminated water a length of time sufficient to allow dissolving of the ozone. Ozone contact time segment 24 may have a series of sharply angled turns creating internal water turbulence. Such water turbulence within the contact time segment 24 assists in breaking up larger bubbles into smaller ones, increasing their total surface area, thereby increasing the rate of dispersion of ozone gas. Suitably, other water turbulence inducing means such as strainers and baffles, as will be further explained, may be installed within the interior bore of the ozone contact time segment 24. The appropriate length of the contact time segment 24 varies depending upon factors such as water flow speed, volume of injected gas, and water temperature.

Referring further to FIG. 1, water emitting from the ozone contact time segment 24 typically includes contaminants, dissolved ozone gas, and submerged bubbles of other atmospheric gases. The presence of bubbles of other gases at such point results from the fact that ozone gas is generally much more soluble within water than common air components such as nitrogen, oxygen, and carbon dioxide. At the point dispersion of the ozone gas becomes substantially complete, bubbles of such other gases typically remain. The water, including contaminants, bubbles, and dissolved ozone, emits from the downstream end of the ozone contact time segment 24 to enter a water inlet port 28 of a hollow, vertically oriented bubble separator column 26. In addition, a residual of ozone gas may still exist in the bubbles, which is required by current regulations to be removed prior to directing the flow of water back to the pool, spa or other receptacle.

Figure 2:
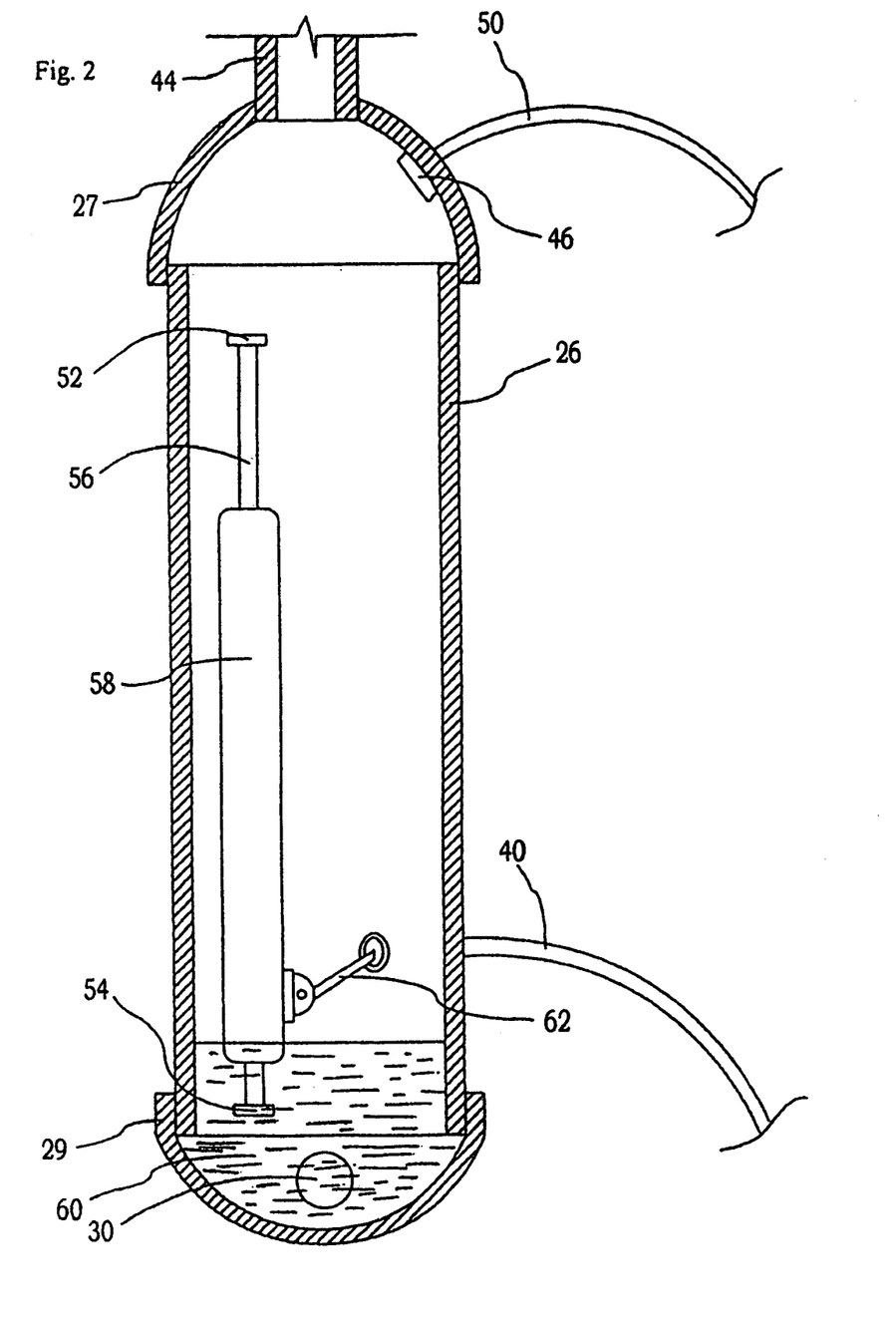
FIG. 2 is a sectional view of a component of the assembly as indicated in FIG. 1.

Referring simultaneously to FIGS. 1 and 2, the bubble separator column 26 serves the function of separating undesirable bubbles from the water. As water flows through the water inlet port 2S and thence downward through the hollow bore of the bubble separator column 28, bubbles within the water rise upward where gasses therein are emitted from the bubble separator column 26 through an off gassing vent 44. The upper and lower ends of the bubble separator column 26 are closed by upper and lower caps 27 and 29, such caps being apertured at an input port 28, the off gassing vent 44, and at an output port 30.

Referring further to FIGS. 1 and 2, the flow of fluids, gaseous and liquid, through the off gassing vent 44 is preferably controlled by a solenoid valve 34, such valve 34 receiving its power supply via a power cord 26. The solenoid valve 24 is preferably spring biased to a normally open position. In the event the water level within the bubble separator column 26 rises excessively, immersion of a water sensitive switch 46 actuates the solenoid valve 34 by closing a circuit including the valve power supply 36 and switch leads 50. Upon such actuation, the solenoid valve 34 closes the off gassing vent 44, preventing water from undesirably spilling from output tube 32. Suitably, float actuated switches may be utilized for actuation of valve 34. Also suitably, a float actuated mechanical flap valve may be utilized in place of the solenoid valve 34. Vent 44 may be coupled to tubing that carries the gasses to the outdoors, or to a device for destroying residual ozone not absorbed by the water.

Further referring simultaneously to FIGS. 1 and 2, it is desirable that water containing pathogens or undesirable dissolved solids contain a high concentration of dissolved ozone gas for a length of time sufficient to allow beneficial reactions between the dissolved ozone gas molecules and the contaminants. Accordingly, in the instant inventive assembly, the bubble separator column 26 further functions as an enhanced concentration chemical reaction chamber. Performance of such function is accomplished through the installation of a solenoid valve 38 which controls water flow through the lower outlet port 30 of the bubble separator column 26. The solenoid valve 38 is spring biased in a normally open position, assuring that water continues to flow out of the bubble separator column 26 upon cut off of electrical power.

Further referring simultaneously to FIGS. 1 and 2, a common toggle switch 62 has water sealed terminal leads 40 which extend through the wall of the bubble separator column, such leads 40 extending to the solenoid valve 38 and making up a part of such valve's power supply circuit. As water 60 within the interior bore of the bubble separator column 26 rises, a float 58 slidably mounted over a slide bar 56 buoyantly rises. The slide bar is preferably fixedly mounted at its upper and lower ends upon the inner wall of the bubble separator column 26 by means of upper and lower float support brackets 52 and 54. As the float 58 upwardly rises, a toggle switch 62 pivotally linked to the float 58 is tripped upwardly, breaking the electrical circuit powering the solenoid valve 38. As the water level within the bubble separator column 26 falls, the weight of the float 58 downwardly trips the toggle switch, closing such electric circuit and actuating the solenoid valve 34 to interrupt the flow of water emitting from the water outlet port 30. Preferably, the buoyancy and weight of the float 58, along with the trip pressure of the toggle switch 62 are calibrated so that the switch 62 trips upwardly only after the water level sufficiently rises, and so that the switch 62 trips downwardly only after the water level reaches a sufficiently low point.

The interaction between the float 58, the toggle switch 62, and the solenoid valve 38 produces a hysteresis effect, causing the water level within the bubble separator column 26 to cyclically rise and fall, continuously alternately collecting and discharging the water 60. Such hysteresis effect provides far beneficial chemical reactions of ozone with contaminants in a water environment including enhanced concentrations of dissolved ozone.

In yet another embodiment, a float actuated mercury switch (not drawn) may be used as a substitute for the toggle switch 62. Also suitably, upper and lower water sensing switches (not drawn) may be utilized in place of float actuated mercury or toggle switches. Also suitably, a wholly mechanical float actuated floating flap valve (not drawn) may be utilized to induce the desired cyclical collection and discharge of water within the bubble separator column 26. Numerous other suitable means for inducing cyclical collection and discharge of water within the bubble separator column 26 may be utilized.

Referring to FIG. 1, purified water emitting from output port 42 of the assembly for purifying water 1 may be router directly to the body of purified water (e.g., a tank of drinking water, a swimming pool, a whirlpool or hot tub). Alternately, water emitting from output port 42 may be routed to a point upstream of an input port of a water pump (not drawn) which drives water into the water input port 16; such routing creating a feedback loop for enhanced water purification. Where a feedback loop is utilized, a flow divider is necessarily installed to split the flow of water between the inventive water purifying assembly 1 and the body of water to be purified.

Figure 3:
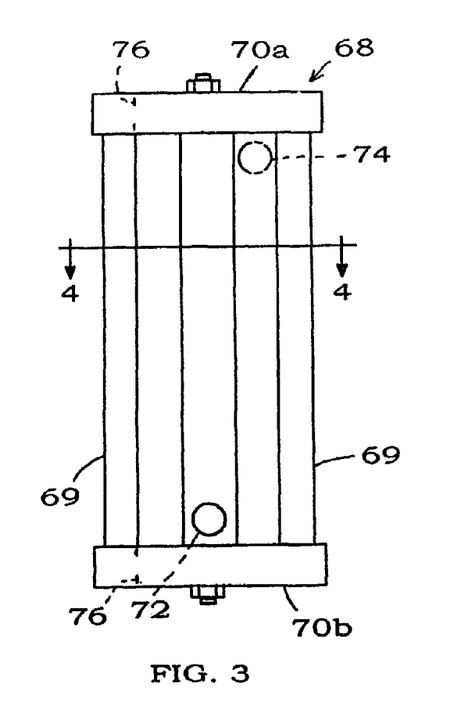
FIG. 3 is a view of a contact length segment employing vertical tubes wherein water flows alternately upwardly and downwardly through the tubes.
Figure 4:
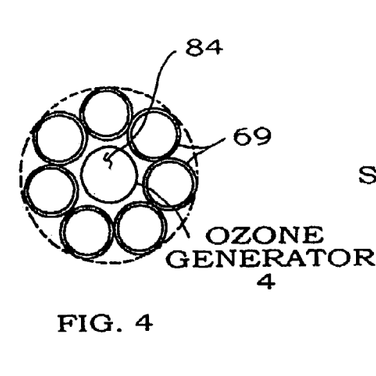
FIG. 4 is a sectional view taken along lines 4—4 of FIG. 3.

In another embodiment of the invention, and referring to FIG. 3, one embodiment of a counterflow and mixing apparatus 68 of the present invention is shown. In the above-described embodiment, apparatus 68 may replace the contact time segment 24. Here, a plurality of tubes 69 may be circumferentially arranged as shown in FIG. 4, with ends thereof capped on both ends by caps 70a and 70b. A water inlet 72 and water outlet 74 (both shown in dashed lines) are conventionally provided, as by providing those tubes 69 having the inlet and outlet therein with appropriate T fittings. At the top and bottom of adjacent tubes 69 are communicating passages or openings 76 for allowing water to flow through respective adjacent tubes. As such, with the water inlet located at a bottom of apparatus 68, water flows into apparatus 68 through inlet 72, up through the tube 69 where at the top the water passes through opening 76 into the adjacent tube 69. At that point the flow of water proceeds downward in the adjacent tube 69, and upon reaching a bottom thereof it then passes through an opening 76 and proceeds upward in that tube 69. The water thus flows upwardly and downwardly through adjacent tubes around apparatus 68 until exiting at outlet 74. Openings 76 in adjacent tubes 69 may be constructed in upper and lower sides of the tubes and sealed by appropriately configured gaskets, or glued together with a caulking-type glue so as to gluably seal the interface between adjacent tubes and direct water through the adjacent openings. In another embodiment, caps 70a and 70b may be constructed having passages molded or cut therein so as to direct water flow into and from adjacent tubes 69. Alternately, each tube may be provided with threaded ends, with individual caps threadably engaging ends of the tubes. Where apparatus 68 is to be strictly used in a counterflow application, the ends of tubes 69 may simply be fitted with curved 180 degree fittings so as to direct flow of water as described above. In a typical application for a hot tub, spa, jetted tub or similar bathing receptacle, the tubes 69 may be 12–18 inches or so in length and number of tubes selected such that the contact length may be from about 4–8 feet or so in length. Diameter of these tubes may be from about ½ to 1 inch or so. For a larger volume of water, such as a swimming pool, diameter of the tubes and length of the apparatus may be increased to match the diameter of tubing used in plumbing of the pool.

Figure 5:
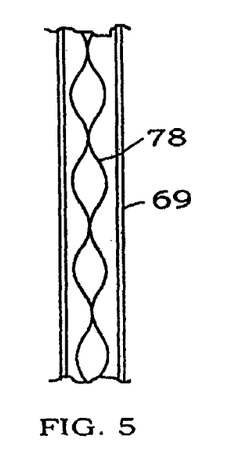
FIG. 5 is a cut-away view of a single contact tube having a static mixer disposed therein.
Figure 6:
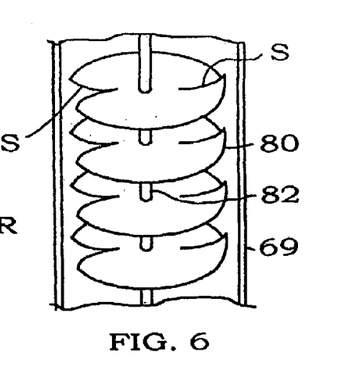
FIG. 6 is a view of a different static mixer in a single contact tube.

In order to overcome these problems, Applicant proposes that static mixers be placed within tubes 69 to break up the laminar flow therein. Accordingly, and referring to FIG. 5, a static mixer 78 is constructed in the form of a twisted, elongated sheet of material, such as a metal or plastic, which when mounted within a tube 69, causes water flow therein to become turbulent. FIG. 6 shows plurality of static mixers 80 mounted to a rod 82, with each static mixer constructed as a disk having two radial, opposed slits S, with the material on opposite sides of the slit bent vertically in opposite directions. Alternately, fixed propeller-like structures or any structure that breaks up the laminar flow may be used. These static mixers effectively break up larger bubbles into smaller bubbles and insure that the fluid around the bubbles is maintained in a mixed condition so that ozone within the bubbles is allowed to dissipate within the water. The static mixers may be positioned throughout the length of the tube they are fitted in, or may be fitted in the upper ends and/or lower ends of the tubes.

Figure 7:
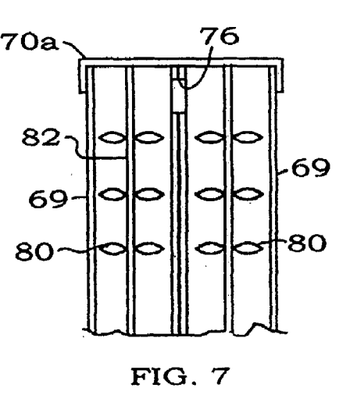
FIG. 7 is a view showing construction details of a static mixer arrangement adapted for relatively convenient cleaning.

With static mixers constructed within tubes 69 as described, another problem arises when the static mixers become clogged or dirty. In order to overcome this problem, Applicant proposes to mount the rods 82 (or other members holding the mixers) to one of caps 70a, 70b as shown in FIG. 7. With this construction, the rods and static mixers may be removed as a single unit when the cap having the rods mounted thereto is removed, thus easily facilitating cleaning of the static mixers. Where each tube is individually capped, each cap is fitted with a rod 82 mounted thereto.

The reactions of ozone in contaminated water depend on concentration of ozone in the water. Here, in turbulent water just downstream an injector where ozone is drawn into the water, bacteria are killed rapidly. More resistant organisms, such as protozoa, require comparatively prolonged exposure at a higher concentration of ozone in order to kill them. Typically, such sanitization against protozoan organisms is accomplished in packed column systems where an array of diffusers are positioned at the bottom of a tank, with ozone fed to the diffusers so that the ozone bubbles up through water in the tank. As such, Applicant's system may simulate a packed column system by fitting approximately half or so of the tubes 69 with static mixers, with the remaining tubes 69 not containing the mixers, allowing free flow of water therethrough. Such an assembly 68 may be provided in place of contact length 24 (FIG. 1) so that just downstream from injector 23 the first 3 or 4 of tubes 69 contain static mixers to violently mix the water, rapidly killing any bacterial and viral organisms, with the remaining tubes 69 not containing any mixers serving as counterflow tubes. Here, with apparatus 68 oriented vertically, water would freely and comparatively smoothly flow up one tube and down the next (these tubes not containing mixers), allowing a residual of ozone to accumulate in the same manner as a packed column system, thus killing protozoan organisms. Additionally, where water flows downward in tubes 69, the water flow is more turbulent, causing more buoyant, larger bubbles previously formed to be broken up. In another embodiment, the counterflow tubes 69 without the mixers may be oriented just after the venturi injector 23, with tubes 69 containing the static mixers positioned thereafter in the water flow. Alternately, a linear counterflow array may be provided wherein tubes 69 are not circularly arranged, but are inline. Here, some or all of the tubes 69 may be provided with static mixers, with top or bottom (or both) ends of these tubes provided with threads to which individual threaded caps are engaged, the mixers being in turn attached to the cap generally as shown in FIG. 7.

Other embodiments include a counterflow system of longer or shorter length than that disclosed, and which may be in other configurations other than circularly arranged. For instance, 4 counterflow tubes may be arrayed in a parallelogram or square arrangement, and may or may not be fitted with static mixers. Other enhancements may include constructing the counterflow tubes and end parts of a transparent material, and provide lighting such as that described in Applicant's application Ser. No. 09/717,903, filed Nov. 20, 2000, now U.S. Pat. No. 6,428,756 wherein ultraviolet light from the ozone generator is directed onto phosphors that in turn radiate in the visible spectrum. Here, ozone gas generator 4 (FIG. 1) may be constructed having transparent outer walls containing or coated with phosphor and positioned within the hollow region 84 (FIG. 4) so that the entire apparatus 68 (FIG. 3) is illuminated from within. Additionally, this would conserve space and generally provide cooling of the ozone gas generator 4. Further, in a circular embodiment as described with the ozone generator centered therein, and where ultraviolet-transmissive materials are used in walls of the ozone generator and water-carrying tubes and not coated with phosphor compounds, ultraviolet light from the ozone generator radiates into the water flow tubes, greatly assisting in killing any microbiota in the water. In addition, ultraviolet radiation used in ozone generators contains radiation at the 254 wavelength, which is known to disassociate ozone and release free atomic oxygen. As such, with the ozone generator and water-carrying tubes constructed of an ultraviolet transparent material as described, such as quartz, and with the ozone generator located within hollow region 84, reaction times are increased due to ozone in the water being disassociated into free atomic oxygen.

Figure 8:
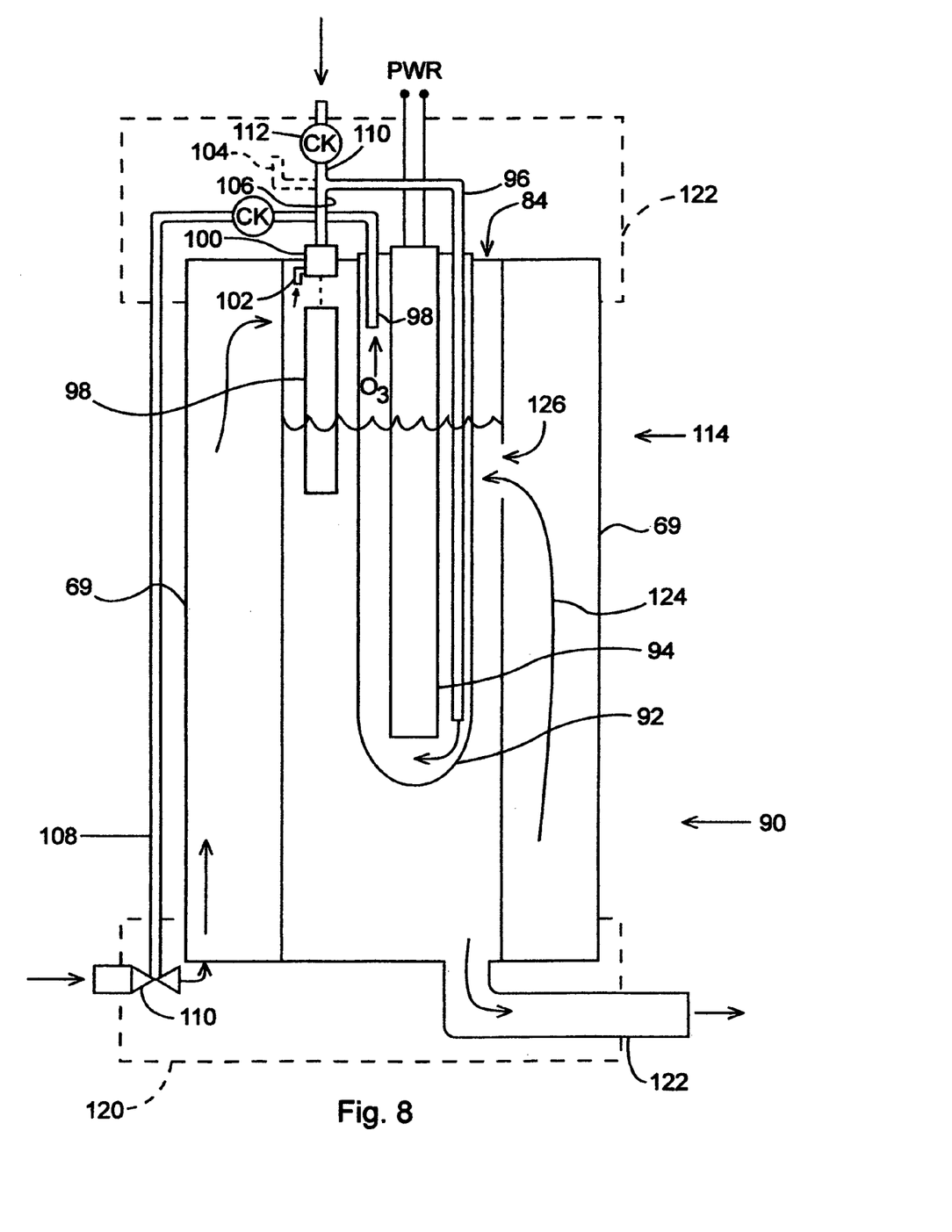
FIG. 8 is a diagrammatic view of yet another embodiment of the invention.

In yet another embodiment of the invention, and referring to the block or schematic diagram of FIG. 8, a water purifier 90 is shown wherein a quartz tube 92 is mounted within hollow region 84 formed by the circular arrangement of the tubes (FIG. 4). An ultraviolet lamp 94 is mounted within quartz (or other ultraviolet transmissive material) tube 92 so as to produce ozone and to provide ultraviolet radiation to the surrounding water, as will be explained. Lamp 94 is mounted within the hollow region 84 formed by tubes 69 so as to be removable for replacement and to seal the tube with respect to any water leaks that may occur, which otherwise may present a dangerous shock hazard, and is conventionally powered, as should be apparent to one skilled in the art. An air inlet tube 96 may extend as shown along most of the length, i.e. more than halfway, of the ultraviolet tube 94, and provides a flow of air to the interior of tube 92 beginning at a point generally furthest from a tube 98 from which ozone-containing gas is drawn. This construction allows air containing oxygen to be moved generally the full length of lamp 94 in order to maximize the amount of ozone produced.

In addition to an ozone and ultraviolet-producing apparatus mounted within hollow region 84, a bubble separator generally as described above, generically shown as a float 98 and float valve 100, may also be mounted in hollow region 84. Valve 100 is constructed so as to vent air from hollow region 84 responsive to float 98 falling to a point that opens valve 100. Air so vented passes from hollow region 84 via a tube or aperture 102. Float 98 and valve 100 may be configured as described above so as to produce a hysterisis effect wherein the water level cycles between a high point almost fully submerging tube 92 to a low point wherein tube 92 is almost fully exposed to gas in hollow region 84. This embodiment may be used in an enclosed area, such as in conjunction with an indoor spa or hot tub in order to prevent ozone from being expelled into the air. This ozone destruction occurs when the water level falls, exposing the gas in region 84 void of water to ultraviolet radiation. Here, tube 92 blocks most of the 185 nm wavelength of the ultraviolet light, the wavelength that creates ozone, and passes the 254 nm wavelength, the wavelength that disassociates ozone into molecular oxygen and a free atom of oxygen. In outdoor or other environments where minor outgassing is not a concern, the float 98 and valve 100 may be configured to maintain a relatively constant level within hollow region 84 and the gas released by bubbles simply vented to atmosphere, as illustrated by dashed line tube 104 shown connected to expel gasses from float valve 100.

Where a closed loop system is desired, the gas developed from bubbles within chamber 84 is provided via tube 102 and valve 100 to a tube 106 coupled to tube 96 within ultraviolet transmissive tube 92. As stated, air that may contain ozone and free atomic oxygen is then passed the length of ultraviolet lamp 94 and drawn from within tube 92 via outlet tube 98, which in turn is coupled to a tube 108 coupled to a suction port of a venturi 110, recycling the ozone and free atomic oxygen. Of course, as the ozone (and other gasses) diffuses into water flowing through the apparatus and depletes net gasses in the system, additional air is admitted into the system via tube 110 commonly connected to tubes 106 and 96. As there is some pressure within chamber 84, a check valve 112 prevents water from being expelled from hollow region 84. Thus, during operation, air is almost constantly being drawn through check valve 112 into ultraviolet-transmissive tube 92 via tube 96 by venturi suction applied to tube 98.

Figure 9:
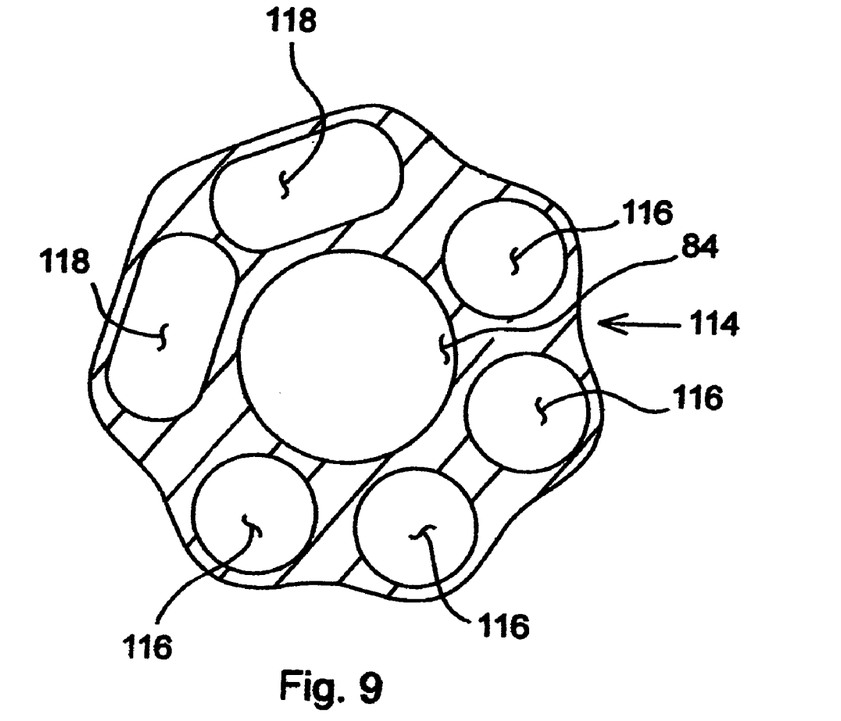
FIG. 9 is an end view of one possible extrusion of the instant invention.

It will be appreciated that the body 114 of the apparatus may be constructed as an extrusion, as shown in FIG. 9, that is simply cut to an appropriate length, such as 18 inches of so, with water flow tubes 116 surrounding hollow region 84 being perhaps ½ to 1 inch or so in diameter for a spa or hot tub. For larger applications, such as a pool, a larger diameter extrusion with water flow tubes 116 of up to 2 inches or so may be used, and may further be from about 2 to 5 feet or so in length. For an even larger application, such as a commercial waste water treatment system, flow tubes may be up to 3 inches in diameter and about 4–8 feet in length. In this instance, the total flow through the system may be divided between a plurality of units. As described above, mixing devices may be mounted in any of the water flow tubes. Also in the instance where an extrusion is used to house the water flow tubes, the inner walls separating two adjacent water flow tubes may be eliminated to form a single compartment, such as compartments 118. Such compartments 118 are suitable for housing electrical and other control components of the system, such as timers and lamp drivers. In this instance, these two combined tubes would be isolated from the water flow. Alternately, the bubble separator, ozone generator or both may be mounted in a respective one of compartments 118, with the control electronics and lamp drivers being in hollow central region 84. Of course, in this instance, no water would be present in the hollow central region.

Figure 10:
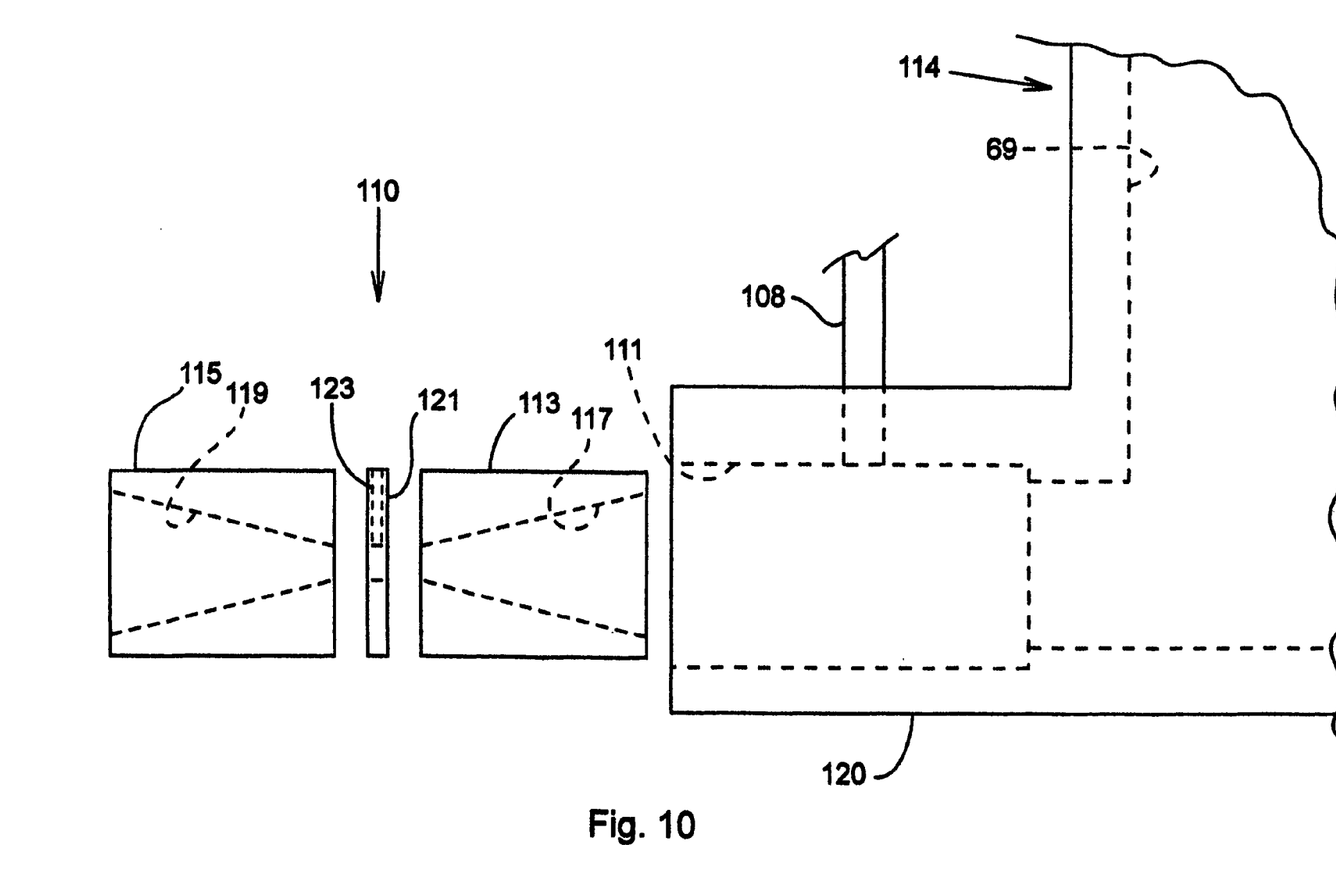
FIG. 10 is a view of the venturi.

Referring to FIG. 10, a base 120, illustrated in dashed lines, serves to cap a bottom end of body 114 and is integrally constructed to contain venturi 110 and a water outlet 122. Here, the venturi 110 may be formed by providing a relatively large bore 111 at the water inlet, and providing a pair of inserts 113, 115 within the bore, the inserts having conical hollows 117, 119 respectively, to form the venturi. The inserts may be separated by a disk 121 having a passageway or opening 123 communicating with suction tube 108. Such a construction has the advantage of being able to adjust or tune the venturi in accordance with water flow through the apparatus by replacing the inserts 113, 115 with other inserts and discs having differently configured conical hollows in order to alter the operational characteristics of the venturi. The outflow from the venturi is channeled by base 120 into one of tubes 69 that serves as the initial contact flow tube as described above. Alternately, a venturi similar to a venturi such as described in Applicant's U.S. Pat. No. 6,192,911, issued Feb. 27, 2001, may be simply attached to base 120 to provide a flow of water mixed with ozonated air to the first contact tube.

A top cap 122 (dashed lines) cooperates with channels in base 120 to channel flow of water from the first contact flow tube serially and alternately in upward and downward directions, as described in the foregoing. As with the base, the check valves and channels for channeling air, as well as any seals required for sealing the ozone generator against possible water leakage, may be incorporated into the top cap 122. Likewise, tube 108 carrying ozonated air may be cast into the extrusion forming the body 114 of the apparatus or provided as an exterior tube.

In a last flow tube 69, and as illustrated by arrow 124, an opening 126 admits the flow of water to the hollow region 84. Here, as this compartment is larger than the flow tubes, thus having a slower water flow therethrough, any bubbles in the flow rise to the surface and into the void above the water level. Gases from hollow region 84 and outside air from check valve 112 are then drawn by venturi suction as described through the ozone generator formed by tube 92 and lamp 94 and subsequently into venturi 110.

In operation, water from a spa, hot tub, jetted tub, pool or the like is initially pumped by a pump (not shown) through venturi 110 which provides ozonated air to the water, after which the water is directed into the first contact flow tube by a channel constructed in base 120. The water flow is then directed by channels in the base and top cap sequentially upwardly and downwardly through the flow tubes until entering the hollow region 84 from the last flow tube. There, bubbles are separated and gasses therein returned to the venturi, along with air from check valve 112. As stated, any ozone present in the water or air in hollow region 84 is disassociated, promoting advanced oxidation reactions that destroy harmful components in the water. In addition, pathogens or other undesirable microbiota that survive until reaching the hollow region 84 are killed by exposure to ultraviolet light.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims, wherein I claim.

I claim:

1. A water sanitizing apparatus comprising:
    a body containing a series of vertical, water-carrying tubes circumferentially arranged around a hollow central region,
    a base for said body,
    a top cap for said body, said base and said top cap configured to channel a flow of water through said water-carrying tubes so that said flow of water is alternately upward and downward through said water-carrying tubes, with a last of said tubes channeling said flow of water into said hollow central region,
    a bubble separator in said hollow central region and configured for removing gases from said flow of water,
    an ozone generator in said hollow central region, and
    a mixing device coupled to provide ozone from said ozone generator to said flow of water.

2. A water sanitizing apparatus as set forth in claim 1 wherein said mixing device is a venturi incorporated in said base.

3. A water sanitizing apparatus as set forth in claim 1 wherein said ozone generator further comprises:
    an ultraviolet light transparent enclosure extending into said flow of water in said hollow central region,
    an ultraviolet lamp in said ultraviolet light-transparent enclosure,
    an air inlet into said ultraviolet light-transparent enclosure,
    an air/ozone outlet from said ultraviolet light-transparent enclosure, said air/ozone outlet coupled to said mixing device,
    whereby air and ozone is provided to said mixing device where said air and ozone is mixed into said flow of water, with a mixture of said air, ozone and water being exposed to ultraviolet light in said hollow central region.

4. A water sanitizing apparatus as set forth in claim 3 wherein said ultraviolet light transparent enclosure is transparent to wavelengths of ultraviolet light of about 254 nm.

5. A water sanitizing apparatus as set forth in claim 3 wherein said air inlet further comprises a tube extending into said ultraviolet light transparent enclosure to a point near an end of said tube so that air from said air inlet is moved the length of said ultraviolet lamp to said air/ozone outlet.

6. A water sanitizing apparatus as set forth in claim 5 wherein said bubble separator further comprises a valve coupled to said air inlet and to an interior of said hollow central region, said valve responsive to a water level in said hollow central region so that when said water level rises to a predetermined level, said valve is opened to admit gasses in said hollow central region into said ultraviolet light transparent enclosure.

7. An assembly for purifying water as set forth in claim 1 wherein said body is an extrusion that may be cut to length for any particular application.

8. An assembly asset forth in claim 7 wherein said body further comprises at least one elongated tubular dry region within which electrical components for said assembly are located.

9. An assembly for purifying water for spas, hot tubs, swimming pools and the like comprising:
    an extruded body having a plurality of vertical, elongated water-carrying channels circumferentially arranged around a central region,
    a top cap and a base for said body, said top cap and said base cooperating between a water inlet and a water outlet to develop a water flow through said water-carrying channels that alternates in upward and downward directions between adjacent said water-carrying channels and into a compartment defined by said central region where water flows last before flowing through said water outlet,
    an ozone generator mounted in said compartment,
    a bubble separator mounted in said compartment, and
    a mixing device mounted in said water inlet to receive said water flow, and coupled to said ozone generator for mixing at least ozone in said water flow.

10. An assembly for purifying water as set forth in claim 9 wherein said mixing device is a venturi constructed as a pair of inserts and a central disc mounted in a bore of said water inlet, said pair of inserts and said disc being interchangable with other inserts and discs to change operational characteristics of said venturi.

11. An assembly for purifying water as set forth in claim 10 wherein said ozone generator further comprises:
    an ultraviolet transparent enclosure in said water flow,
    an ultraviolet lamp producing ultraviolet light at wavelengths of 185 nm and 254 nm, said lamp sealably mounted in said enclosure,
    an air inlet and an air outlet each coupled to an interior of said enclosure.

12. An assembly for purifying water as set forth in claim 11 wherein said ultraviolet transparent enclosure is transparent only to said ultraviolet light of a wavelength of 254 nm for disassociating ozone in said water flow and for killing microbiota in said flow of water.

13. An assembly for purifying water as set forth in claim 12 wherein said bubble separator further comprises a valve having an inlet coupled to receive gasses in said bubble separator, and an outlet coupled to provide said gasses to said ozone generator, said valve responsive to a water level in said last of said compartment rising to a predetermined level.

14. An assembly for purifying water as set forth in claim 13 wherein said predetermined level of said water level is determined by a float.

15. An assembly for purifying water as set forth in claim 12 wherein said water level in said last of said compartment partially submerges said ultraviolet transparent enclosure so that both water and gasses in said last of said compartment receives receive said ultraviolet light of a wavelength of 254 nm.

\* \* \* \* \*